(12) United States Patent
Kimura et al.

(10) Patent No.: US 10,286,496 B2
(45) Date of Patent: May 14, 2019

(54) BRAZING SHEET FORMED OF ALUMINUM ALLOY

(71) Applicants: Kobe Steel, Ltd., Kobe-shi (JP); DENSO CORPORATION, Kariya-shi (JP)

(72) Inventors: Shimpei Kimura, Moka (JP); Akihiro Tsuruno, Moka (JP); Takahiro Izumi, Moka (JP); Yuji Shibuya, Moka (JP); Hayaki Teramoto, Kariya (JP); Shoei Teshima, Kariya (JP); Manabu Hasegawa, Kariya (JP); Michiyasu Yamamoto, Kariya (JP)

(73) Assignees: Kobe Steel, Ltd., Kobe-shi (JP); DENSO CORPORATION, Kariya-shi (JP)

(*) Notice: Subject to any disclaimer, the term of this patent is extended or adjusted under 35 U.S.C. 154(b) by 0 days.

(21) Appl. No.: 15/129,666

(22) PCT Filed: Feb. 9, 2015

(86) PCT No.: PCT/JP2015/053557
§ 371 (c)(1),
(2) Date: Sep. 27, 2016

(87) PCT Pub. No.: WO2015/146322
PCT Pub. Date: Oct. 1, 2015

(65) Prior Publication Data
US 2017/0173740 A1     Jun. 22, 2017

(30) Foreign Application Priority Data

Mar. 28, 2014    (JP) ................................ 2014-070430

(51) Int. Cl.
*B23K 35/02*     (2006.01)
*C22C 21/00*     (2006.01)
(Continued)

(52) U.S. Cl.
CPC ...... *B23K 35/0238* (2013.01); *B23K 35/0233* (2013.01); *B23K 35/286* (2013.01);
(Continued)

(58) Field of Classification Search
None
See application file for complete search history.

(56) References Cited

U.S. PATENT DOCUMENTS

| | | | |
|---|---|---|---|
| 2009/0020585 | A1 | 1/2009 | Fukumoto et al. |
| 2009/0324985 | A1 | 12/2009 | Tsuruno et al. |
| 2013/0260175 | A1 | 10/2013 | Kimura et al. |

FOREIGN PATENT DOCUMENTS

| | | | |
|---|---|---|---|
| JP | 9-95749 | A | 4/1997 |
| JP | H0995749 | * | 4/1997 |

(Continued)

OTHER PUBLICATIONS

English translation of the International Preliminary Report on Patentability and Written Opinion dated Oct. 13, 2016 in PCT/JP2015/053557.
(Continued)

*Primary Examiner* — Daniel J. Schleis
(74) *Attorney, Agent, or Firm* — Oblon, McClelland, Maier & Neustadt, L.L.P.

(57) ABSTRACT

A brazing sheet formed of an aluminum alloy and exhibiting excellent post-brazing strength, corrosion resistance and brazability with a thickness of less than 200 μm is provided. The brazing sheet includes a core layer, a filler layer of an Al—Si based alloy on one side of the core layer, and a sacrificial layer on the other side of the core layer. The core layer includes more than 1.5 mass % and 2.5 mass % or less of Cu, 0.5 mass % to 2.0 mass % of Mn, Al, and inevitable impurities. The sacrificial layer includes 2.0 mass % to 7.0 mass % of Zn, more than 0.10 mass % and 3.0 mass % or
(Continued)

less of Mg, Al, and inevitable impurities. The filler layer and the sacrificial layer each have a thickness of 15 μm to 50 μm. A total clad rate of the filler layer and the sacrificial layer is equal to or less than 50%.

20 Claims, 1 Drawing Sheet

(51) Int. Cl.
  *C22C 21/10* (2006.01)
  *C22C 21/12* (2006.01)
  *B23K 35/28* (2006.01)
  *C22C 21/02* (2006.01)
  *C22C 21/14* (2006.01)
  *C22C 21/16* (2006.01)

(52) U.S. Cl.
  CPC ............ *B23K 35/288* (2013.01); *C22C 21/00* (2013.01); *C22C 21/02* (2013.01); *C22C 21/10* (2013.01); *C22C 21/12* (2013.01); *C22C 21/14* (2013.01); *C22C 21/16* (2013.01)

(56) References Cited

FOREIGN PATENT DOCUMENTS

| | | |
|---|---|---|
| JP | 11-199958 A | 7/1999 |
| JP | 2002-12935 A | 1/2002 |
| JP | 2002-206129 A | 7/2002 |
| JP | 2008-231503 A | 10/2008 |
| JP | 2009-22981 A | 2/2009 |
| JP | 2010-202919 A | 9/2010 |
| JP | 2011-68933 | 4/2011 |
| JP | 2013-213235 A | 10/2013 |
| JP | 2014-55326 A | 3/2014 |

OTHER PUBLICATIONS

International Search Report dated May 12, 2015 in PCT/JP2015/053557, filed Feb. 9, 2015.
Combined Chinese Office Action and Search Report issued in corresponding Chinese patent application No. 201580016328.5 dated Jan. 2, 2018 with English translation of Office Action, 10 pp.

* cited by examiner

BRAZING SHEET FORMED OF ALUMINUM ALLOY

TECHNICAL FIELD

The present invention relates to a brazing sheet formed of an aluminum alloy, which is suitable for use in automobile heat exchangers and the like.

BACKGROUND ART

Brazing sheets are conventionally used as material for heat exchangers of automobiles and the like. A brazing sheet is formed of an aluminum alloy (hereinafter sometimes referred to as an "Al alloy") including a core layer and either a brazing filler layer or a sacrificial layer formed on both sides of the core layer.

In recent years, automobile heat exchangers have tended to reduce their weight and size. With such reductions, the brazing sheets for forming tubes, which occupy the majority of the mass of the heat exchanger, have been required to be thinned. The brazing sheet is thinned to about 200 μm so far; however, to make the brazing sheet much thinner, it needs to have higher strength and corrosion resistance corresponding to the further thinning. However, if the thickness of the core layer is reduced for the thinning of the brazing sheet, the brazing sheet will have difficulty in ensuring the post-brazing strength. On the other hand, if the thickness of the sacrificial layer is reduced, the corrosion resistance becomes difficult to ensure. Further, if the thickness of the brazing filler layer is reduced, the brazability will be degraded.

To address these issues, many studies have been conventionally done. For example, Patent Document 1 discloses a brazing sheet with excellent brazability and post-brazing strength that utilizes an Al—Si—Fe—Cu—Mn—Mg based alloy as the core layer of the brazing sheet. Patent Document 2 discloses a clad material that exhibits excellent post-brazing strength, corrosion resistance and brazability by using an Al—Si—Mn—Cu—Ti based alloy as the core layer of the brazing sheet.

PRIOR ART DOCUMENT

Patent Document

Patent Document 1: JP 2009-22981 A
Patent Document 2: JP 2011-68933 A

DISCLOSURE OF THE INVENTION

Problems to be Solved by the Invention

In the techniques disclosed in Patent Documents 1 and 2, however, the minimum thickness of the brazing sheet shown as the example is 250 μm. Thus, to obtain a much thinner brazing sheet which is less than 200 μm in thickness, the brazing sheet must be developed to achieve the adequate post-brazing strength, corrosion resistance and brazability.

It is revealed that for the thinned brazing sheet of less than 200 μm in thickness, the thickness of the core layer, which is responsible for the strength, is also thinned, which significantly decreases the amounts of remaining respective additive elements after heating for the brazing, resulting in a drastic reduction in the strength of the brazing sheet. In particular, the reduction in the amount of remaining copper (Cu) element, which is added to make the potential of the core layer positive, is confirmed to have a great influence on the properties of the brazing sheet, especially leading to the degradation in not only the strength but also the corrosion resistance.

The present invention has been made in view of the foregoing circumstances, and it is an object of the present invention to provide a brazing sheet formed of an aluminum alloy which exhibits excellent post-brazing strength, corrosion resistance and brazability even though its thickness is less than 200 μm.

Means for Solving the Problems

To solve the foregoing problems, the inventors have diligently studied about the influences of the thickness of the brazing sheet on the compositions of the core and sacrificial layers after a heat treatment for brazing, when the thickness of the brazing sheet is less than 200 μm. Consequently, it is found that as measures to achieve both the adequate strength and corrosion resistance for the brazing sheet which has a thickness of less than 200 μm, the content of Cu added to the core layer increased to a relatively high level, thereby enabling the strengthening, and furthermore, the zinc (Zn) content and thickness of the sacrificial layer is optimized, thereby making it possible to ensure the same level of corrosion resistance as that obtained from a sheet of 200 μm or more in thickness. Moreover, by increasing the magnesium (Mg) content in the sacrificial layer, Mg is found to be further diffused in the core layer, which can contribute to improving the strength of the core layer.

The present invention has been completed based on the new findings mentioned above.

A brazing sheet formed of an aluminum alloy according to the present invention includes a core layer, a brazing filler layer provided on one side of the core layer and formed of an Al—Si based alloy, and a sacrificial layer provided on the other side of the core layer, the brazing sheet having a thickness of less than 200 μm, wherein the core layer includes, Cu: more than 1.5% by mass and 2.5% or less by mass and Mn: 0.5 to 2.0% by mass, with the balance being Al and inevitable impurities, the sacrificial layer includes, Zn: 2.0 to 7.0% by mass and Mg: more than 0.10% by mass and 3.0% or less by mass, with the balance being Al and inevitable impurities, each of the brazing filler layer and the sacrificial layer has a thickness of 15 to 50 μm, and a total of clad rates of the brazing filler layer and the sacrificial layer is equal to or less than 50%.

With the structure mentioned above, the brazing sheet formed of the aluminum alloy in the present invention can achieve high-levels of post-brazing strength, corrosion resistance and brazability with good balance therebetween.

The core layer in the brazing sheet formed of the aluminum alloy in the present invention preferably further includes Si: 0.05 to 0.5% by mass.

With such a structure, silicon (Si) binds to Mg diffused from the sacrificial layer to form a compound, whereby the post-brazing strength of the brazing sheet can be further improved.

The core layer in the brazing sheet formed of the aluminum alloy in the present invention preferably further includes Mg: 0.05 to 0.5% by mass.

With such a structure, the post-brazing strength of the brazing sheet can be further improved.

The core layer in the brazing sheet formed of the aluminum alloy in the present invention preferably further includes at least one selected from the group consisting of Cr: 0.01 to 0.30% by mass, Zr: 0.01 to 0.30% by mass and Ti: 0.05 to 0.30% by mass.

With such a structure, the post-brazing strength and corrosion resistance of the brazing sheet can be further improved.

The sacrificial layer in the brazing sheet formed of the aluminum alloy in the present invention preferably further includes Si: 0.05 to 0.5% by mass.

With such a structure, Si is diffused into the core layer to bind to Mg to forma compound, whereby the post-brazing strength of the brazing sheet can be further improved.

The sacrificial layer in the brazing sheet formed of the aluminum alloy in the present invention preferably further includes Mn: 0.1 to 2.0% by mass.

With such a structure, a solid solution is formed, whereby the post-brazing strength of the brazing sheet can be further improved.

The sacrificial layer in the brazing sheet formed of the aluminum alloy in the present invention preferably further includes Ti: 0.01 to 0.30% by mass.

With such a structure, the corrosion resistance of the brazing sheet can be further improved.

The sacrificial layer in the brazing sheet formed of the aluminum alloy in the present invention preferably further includes at least one of Cr: 0.01 to 0.30% by mass and Zr: 0.01 to 0.30% by mass.

With such a structure, the post-brazing strength and corrosion resistance of the brazing sheet can be further improved.

Effects of the Invention

The brazing sheet formed of the aluminum alloy in the present invention exhibits excellent post-brazing strength, corrosion resistance and brazability even with its thickness of less than 200 μm.

BRIEF DESCRIPTION OF THE DRAWINGS

FIGS. 1A and 1B are schematic diagrams of a jig for evaluating the brazability of a brazing sheet formed of an aluminum alloy according to the present invention, in which FIG. 1A is a perspective view of the entire jig, and FIG. 1B is a front view of the jig.

MODE FOR CARRYING OUT THE INVENTION

Figure 1A:
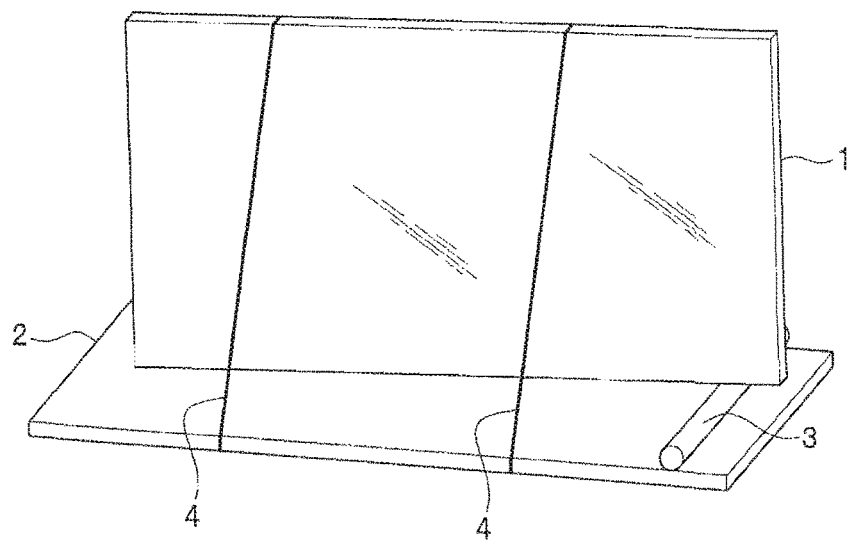

Embodiments for implementing a brazing sheet formed of an aluminum alloy in the present invention will be described in detail below.

The brazing sheet formed of an aluminum alloy according to the present invention includes a core layer, a brazing filler layer provided on one side of the core layer and formed of an Al—Si based alloy, and a sacrificial layer provided on the other side of the core layer. The brazing sheet has a thickness of less than 200 μm. The thickness of the brazing sheet is preferably in a range of 80 to 180 μm. The brazing sheet having its thickness limited to less than 200 μm can reduce the weight of heat exchangers for automobiles and the like.

The core layer, brazing filler layer and sacrificial layer of the brazing sheet formed of the aluminum alloy in the present invention will be described sequentially below.

<Core Layer>

The core layer of the present invention is formed of an aluminum alloy that includes Cu: more than 1.5% by mass and 2.5% or less by mass, and Mn: 0.5 to 2.0% by mass, with the balance being Al and inevitable impurities. The core layer in the present invention preferably further includes Si: 0.05 to 0.5% by mass. The core layer in the present invention preferably further includes Mg: 0.05 to 0.5% by mass. The core layer in the present invention preferably further includes at least one selected from the group consisting of Cr: 0.01 to 0.30% by mass, Zr: 0.01 to 0.30% by mass and Ti: 0.05 to 0.30% by mass.

The respective elements forming the core layer will be described below.

(Cu in Core Layer: More than 1.5% by Mass and 2.5% or Less by Mass)

Cu contributes to improving the post-brazing strength of the brazing sheet by solid-solution strengthening. When the Cu content is 1.5% or less by mass, a remaining Cu content after the brazing in the brazing sheet of less than 200 μm in thickness is lacking, leading to insufficient strength and corrosion resistance of the brazing sheet. On the other hand, when the Cu content exceeds 2.5% by mass, a solidus temperature of the core layer is decreased, and thus the core layer might melt during the brazing. Therefore, the Cu content in the core layer is more than 1.5% by mass and 2.5% or less by mass, and preferably 1.7 to 2.4% by mass.

(Mn in Core Layer: 0.5 to 2.0% by Mass)

Manganese (Mn) forms an intermetallic compound with Al and Si, and is finely distributed in crystal grains, contributing to dispersion strengthening, thus improving the post-brazing strength of the brazing sheet. When the Mn content is less than 0.5% by mass, the number of intermetallic compounds is decreased, and thereby the dispersion strengthening is not improved by the intermetallic compounds, thus degrading the post-brazing strength of the brazing sheet. On the other hand, when the Mn content exceeds 2.0% by mass, a number of coarse intermetallic compounds are formed, and thus a rolling process itself is difficult to perform, making the manufacture of the brazing sheet difficult. Therefore, the Mn content in the core layer is set at 0.5 to 2.0% by mass, and preferably at 0.8 to 1.7% by mass.

(Si in Core Layer: 0.05 to 0.5% by Mass)

Silicon (Si) forms an intermetallic compound with Al and Mn, and is finely distributed in crystal grains, contributing to dispersion strengthening, thus improving the post-brazing strength. When the Si content is less than 0.05% by mass, the effect of improving the post-brazing strength becomes insufficient. On the other hand, when the Si content exceeds 0.5% by mass, the solidus temperature of the core layer is decreased, whereby the core layer might melt during heating for brazing. Thus, to exhibit the effect due to containing Si in the core layer, the Si content is set at 0.05 to 0.5% by mass, and preferably 0.10 to 0.45% by mass.

(Mg in Core Layer: 0.05 to 0.5% by Mass)

Magnesium (Mg) has the effect of forming a fine precipitation phase of $Mg_2Si$ together with Si to improve the post-brazing strength of the brazing sheet. When the Mg content is less than 0.05% by mass, the effect of improving the post-brazing strength becomes insufficient. On the other hand, when the Mg content exceeds 0.5% by mass, a flux reacts with Mg when brazing using a non-corrosive flux, thus failing to execute brazing. Therefore, to exhibit the effect due to containing Mg in the core layer, the Mg content is set at 0.05 to 0.5% by mass, and preferably 0.10 to 0.45% by mass.

(Cr in Core Layer: 0.01 to 0.30% by Mass)

Chromium (Cr) binds to Al to form an $Al_3Cr$ intermetallic compound and thereby has the effect of improving the post-brazing strength of the brazing sheet. When the Cr content is less than 0.01% by mass, the effect of improving the post-brazing strength becomes insufficient. On the other hand, when the Cr content exceeds 0.30% by mass, coarse intermetallic compounds are formed during casting, which might cause cracking during rolling. Therefore, to exhibit the effect due to containing Cr in the core layer, the Cr content is set at 0.01 to 0.30% by mass, and preferably 0.05 to 0.25% by mass.

(Zr in Core Layer: 0.01 to 0.30% by Mass)

Zirconium (Zr) binds to Al to form an $Al_3Zr$ intermetallic compound and thereby has the effect of improving the post-brazing strength of the brazing sheet by dispersion strengthening. When the Zr content is less than 0.01% by mass, such an effect is not sufficient. On the other hand, when the Zr content exceeds 0.30% by mass, coarse $Al_3Zr$ intermetallic compounds are formed during casting, which makes it more likely to cause cracking during rolling. Therefore, to exhibit the effect due to containing Zr in the core layer, the Zr content is set at 0.01 to 0.30% by mass, and preferably 0.03 to 0.25% by mass.

(Ti in Core Layer: 0.05 to 0.30% by Mass)

Titanium (Ti) is distributed in the form of layer in an Al alloy, thereby enabling the reduction in propagation speed of corrosion in the sheet thickness direction, which contributes to improving the corrosion resistance of the brazing sheet. When the Ti content is less than 0.05% by mass, the layered distribution of Ti is insufficient, thus failing to obtain the adequate effect of improving the corrosion resistance of the brazing sheet. On the other hand, when the Ti content exceeds 0.30% by mass, coarse $Al_3Ti$ intermetallic compounds are easily formed during casting, leading to the degradation in workability, thus making it more likely to cause cracking during rolling. Therefore, to exhibit the effect due to containing Ti in the core layer, the Ti content is set at 0.05 to 0.30% by mass, and preferably 0.07 to 0.25% by mass.

(Balance in Core Layer: Al and Inevitable Impurities)

The components of the core layer include the balance being Al and inevitable impurities, in addition to the components mentioned above. Note that the inevitable impurities can include, for example, Fe, Zn, in, Sn and Ni. The balance contains 0.30% or less by mass (preferably 0.25% or less by mass) of Fe, 0.15% or less by mass (preferably 0.10% or less by mass) of Zn, and 0.05% or less by mass (preferably 0.03% or less by mass) of each of In, Sn and Ni. As long as the contents of these elements are limited in this way, the core layer can be allowed to contain these components without interrupting the effects of the present invention. When the content of one or each of the above-mentioned Si, Mg, Cr, Zr and Ti elements is below the corresponding lower limit, such an element can be defined as the inevitable impurity.

<Brazing Filler Layer>

A brazing filler layer of the present invention is formed of an Al—Si based alloy. Examples of the Al—Si based alloy include general JIS alloys, such as JIS alloy 4343 and JIS alloy 4045. Here, the Al—Si based alloy can include, in addition to an Al alloy containing Si, an Al alloy further containing Zn. That is, the Al—Si based alloy can be an Al—Si based alloy or an Al—Si—Zn based alloy. For example, an Al—Si based alloy containing 7 to 12% by mass of Si can be used.

(Thickness of Brazing Filler Layer: 15 to 50 μm)

The brazing filler layer formed of the Al—Si based alloy normally starts to melt at about 580° C. or higher and is converted into a liquid phase, which flows to fill in a bonding portion. When the thickness of the brazing filler layer is less than 15 μm, the amount of fluid brazing filler layer in the bonding portion is lacking, which might degrade the brazability. On the other hand, when the thickness of the brazing filler layer exceeds 50 μm, the amount of fluid brazing filler layer is increased, and part of the brazing filler layer might be diffused into and erode the core layer, causing erosion. In particular, this influence appears remarkable for the brazing sheet of less than 200 μm in thickness. Therefore, the thickness of the brazing filler layer is set at 15 to 50 μm.

<Sacrificial Layer>

The sacrificial layer in the present invention contains Zn: 2.0 to 7.0% by mass, and Mg: more than 0.10% by mass and 3.0% or less by mass, with the balance being Al and inevitable impurities. Examples of such an Al—Zn—Mg based alloy include general JIS alloys, such as JIS alloy 7072 or JIS alloy 7N01, The sacrificial layer in the present invention preferably further includes Si: 0.05 to 0.5% by mass. The sacrificial layer in the present invention preferably further includes Mn: 0.1 to 2.0% by mass. The sacrificial layer in the present invention preferably further includes Ti: 0.01 to 0.30% by mass. The sacrificial layer in the present invention preferably further includes one or more elements from Cr: 0.01 to 0.30% by mass and Zr: 0.01 to 0.30% by mass.

The respective elements forming the sacrificial layer in the present invention will be described below.

(Zn in Sacrificial Layer: 2.0 to 7.0% by Mass)

Zinc (Zn) makes the potential of the sacrificial layer negative, causing a difference in potential of the sacrificial layer from the core layer, contributing to improvement of the corrosion resistance. When the Zn content is less than 2.0% by mass, the difference in potential from the core layer becomes lacking, which makes it difficult to ensure the corrosion resistance of the brazing sheet. On the other hand, when the Zn content exceeds 7.0% by mass, a solidus temperature of the sacrificial layer is decreased, and the sacrificial layer might melt during brazing. Therefore, the Zn content in the sacrificial layer is set at 2.0 to 7.0% by mass, and preferably at 2.5 to 6.0% by mass.

(Mg in Sacrificial Layer: More than 0.10% by Mass and 3.0% or Less by Mass)

Magnesium (Mg) is diffused into the core layer during brazing, contributing to improvement of the post-brazing strength of the core layer. When the core layer contains Si, Mg binds to Si to form a precipitation phase to cause precipitation strengthening, thus contributing to further improving the post-brazing strength of the brazing sheet. When the Mg content is 0.10% or less by mass, such an effect of improving the post-brazing strength is insufficient. On the other hand, when the Mg content exceeds 3.0% by mass, the pressure-bondability between the core layer and sacrificial layer might be degraded. Therefore, the Mg content in the sacrificial layer is set at more than 0.10% by mass and 3.0% or less by mass, and preferably at 0.20 to 2.5% by mass.

(Si in Sacrificial Layer: 0.05 to 0.5% by Mass)

Si is diffused into the core layer during brazing, and binds to Mg to form a precipitation phase to cause precipitation strengthening, thus contributing to further improving the post-brazing strength of the brazing sheet. When the Si content is less than 0.05% by mass, the effect of improving the strength due to the formation of the precipitation phase with Mg becomes insufficient. On the other hand, when the Si content exceeds 0.5% by mass, the solidus temperature of the sacrificial layer is decreased, whereby the sacrificial layer might melt during brazing. Thus, to exhibit the effect due to containing Si in the sacrificial layer, the Si content is set at 0.05 to 0.5% by mass, and preferably at 0.1 to 0.45% by mass.

(Mn in Sacrificial Layer: 0.1 to 2.0% by Mass)

Mn contributes to improving the post-brazing strength of the brazing sheet by solid-solution strengthening. When the Mn content is less than 0.1% by mass, the above-mentioned effect becomes insufficient. On the other hand, when the Mn content exceeds 2.0% by mass, coarse intermetallic compounds are formed during casting, degrading the workability of the brazing sheet, thus making it more likely to cause cracking during rolling. Thus, to exhibit the effect due to containing Mn in the sacrificial layer, the Mn content is set at 0.1 to 2.0% by mass, and preferably at 0.2 to 1.5% by mass.

(Ti in Sacrificial Layer: 0.01 to 0.30% by Mass)

Titanium (Ti) is distributed in the form of layer in the Al alloy, whereby the potential distribution in the brazing sheet is formed corresponding to the concentration of Ti. This results in the layered form of corrosion, enabling the decrease in propagation speed of corrosion in the sheet thickness direction. Thus, the appropriate Ti content contributes to improving the corrosion resistance. When the Ti content is less than 0.01% by mass, the effect of improving the corrosion resistance cannot be obtained sufficiently. On the other hand, when the Ti content exceeds 0.30% by mass, coarse $Al_3Ti$ intermetallic compounds are easily formed during casting, degrading the workability, thus making it more likely to cause cracking during rolling. Thus, to exhibit the effect due to containing Ti in the sacrificial layer, the Ti content is set at 0.01 to 0.30% by mass, and preferably at 0.05 to 0.25% by mass.

(Cr in Sacrificial Layer: 0.01 to 0.30% by Mass)

Chromium (Cr) binds to Al to form an $Al_3Cr$ intermetallic compound and thereby has the effect of improving the post-brazing strength of the brazing sheet by dispersion strengthening, as well as improving the corrosion resistance by refining of crystal grains. When the Cr content is less than 0.01% by mass, the effects of improving the strength and corrosion resistance are insufficient. On the other hand, when the Cr content exceeds 0.30% by mass, coarse $Al_3Cr$ intermetallic compounds are formed, which might easily cause cracking during rolling. Therefore, to exhibit the effect due to containing Cr in the sacrificial layer, the Cr content is set at 0.01 to 0.30% by mass, and preferably at 0.05 to 0.25% by mass.

(Zr in Sacrificial Layer: 0.01 to 0.30% by Mass)

Zr binds to Al to form an $Al_3Zr$ intermetallic compound and thereby has the effect of improving the post-brazing strength of the brazing sheet by dispersion strengthening, as well as improving the corrosion resistance by refining of crystal grains. When the Zr content is less than 0.01% by mass, the effect of improving the strength cannot be obtained sufficiently. On the other hand, when the Zr content exceeds 0.30% by mass, coarse $Al_3Zr$ intermetallic compounds are formed during casting, degrading the workability, which might easily cause cracking during rolling. Therefore, to exhibit the effect due to containing Zr in the sacrificial layer, the Zr content is set at 0.01 to 0.30% by mass, and preferably at 0.05 to 0.25% by mass.

(Balance in Sacrificial Layer: Al and Inevitable Impurities)

The components of the sacrificial layer include the balance being Al and inevitable impurities, in addition to the components mentioned above. Note that the inevitable impurities can include, for example, Fe, In, Sn and Ni. The sacrificial layer is allowed to contain 0.30% or less by mass (preferably 0.25% or less by mass) of Fe, and 0.05% or less by mass (preferably 0.03% or less by mass) of each of In, Sn and Ni without interrupting the effects of the present invention. When the content of one or each of the above-mentioned Si, Mn, Ti, Cr, and Zr elements is below the corresponding lower limit, such an element can be defined as the inevitable impurity.

(Thickness of Sacrificial Layer; 15 to 50 μm)

The sacrificial layer is essential to ensuring the corrosion resistance as a sacrificial anode material at an inner surface of the brazing sheet for a heat exchanger such as a radiator. When the thickness of the sacrificial layer is less than 15 μm, the absolute amount of Zn in the sacrificial layer becomes small even though the Zn content is set as mentioned above, and the potential to the core layer does not become sufficiently negative, degrading the corrosion resistance on the sacrificial layer side. On the other hand, when the thickness of the sacrificial layer exceeds 50 μm, in the brazing sheet of less than 200 μm in thickness, the clad rate of the sacrificial layer becomes larger, degrading the pressure-bondability. Therefore, the thickness of the sacrificial layer is set at 15 to 50 μm.

(Total of Clad Rates of the Brazing Filler Layer and Sacrificial Layer Set to be Equal to or Less than 50%)

In the brazing sheet formed of the aluminum alloy in the present invention, the total of clad rates of the brazing filler layer and sacrificial layer is set to be equal to or less than 50%. Here, the total of clad rates of the brazing filler layer and sacrificial layer (i.e. the sum of the clad rate of the brazing filler layer and the clad rate of the sacrificial layer) can be determined in terms of ratio (%) of the sum of the thicknesses of the brazing filler layer and sacrificial layer to the thickness of the brazing sheet. That is, the total of clad rates of the brazing filler layer and sacrificial layer is represented by formula of $100 \times (R+G)/T$ (%) where T (μm) is a thickness of the brazing sheet, R (μm) is a thickness of the brazing filler layer, and G (μm) is a thickness of the sacrificial layer.

When such a total of clad rates exceeds 50%, the brazing sheet of less than 200 μm in thickness makes it difficult to ensure the adequate brazability. The upper limit of the total of the clad rates of the brazing filler layer and sacrificial layer is preferably 40%, whereas the lower limit thereof is preferably 25% in terms of ensuring the adequate brazability and corrosion resistance while sufficiently ensuring the thicknesses of the brazing filler layer and sacrificial layer in the brazing sheet of less than 200 μm in thickness.

<Manufacturing Method for the Brazing Sheet>

The core layer, sacrificial layer and brazing filler layer, which are materials for the brazing sheet formed of the aluminum alloy in the present invention, can be manufactured by common methods. The manufacturing methods for the core layer, sacrificial layer and brazing filler layer are not particularly limited. For example, these materials can be manufactured by the following methods.

After casting the aluminum alloy for the core layer with the above-mentioned composition at a predetermined casting temperature, an ingot obtained in this manner is subjected to face milling as needed, followed by homogeneous heat treatment, which can produce a core-layer ingot.

Further, after casting the aluminum alloys for the sacrificial layer and the brazing filler layer with the above-mentioned compositions at predetermined casting temperatures, ingots obtained in this manner are subjected to face milling as needed, followed by homogeneous heat treatment. Subsequently, these ingots are hot-rolled, thus enabling the manufacture of a sacrificial layer member and a brazing filler layer member.

Thereafter, the sacrificial layer member is overlapped on one side of the core-layer ingot, while the brazing filler layer member is overlapped on the other side of the core-layer ingot, and these overlapped members are then hot-rolled, whereby a sheet member is formed through press-bonding and rolling. Then, the sheet member is cold-rolled to produce an aluminum alloy clad material with a predetermined thickness, thereby producing a brazing sheet. The sheet member may be subjected to an annealing process as appropriate during or after the cold-rolling process.

While the brazing sheet formed of the aluminum alloy and the manufacturing method therefor according to the present invention have been described above, other conditions not specified above can be those known in the related art to implement the present invention. Such other conditions are not limited as long as they exhibit the effects obtained by the above-mentioned specific conditions.

EXAMPLES

The present invention will further be described in detail below with reference to Examples.

The core-layer aluminum alloys, sacrificial-layer aluminum alloys and brazing filler layer aluminum alloys with the compositions shown in Tables 1 to 3 were melted, casted, and subjected to the homogeneous heat treatment by common methods, thereby producing a core-layer ingot (core-layer member), a sacrificial-layer ingot and a brazing filler layer ingot. The sacrificial-layer ingot and the brazing filler layer ingot were hot-rolled into a predetermined thickness, thereby producing a sacrificial-layer member and a brazing filler layer member. Then, the sacrificial-layer member was overlapped on one side of the core-layer member, and the brazing filler layer member was overlapped on the other side thereof in such a manner as to achieve various combinations of materials shown in Tables 4 and 5, followed by hot-rolling to pressure-bond these members, thereby producing a sheet member. Thereafter, cold-rolling was performed to make brazing sheets, each having a predetermined thickness (samples No. 1 to 58).

Note that in Tables 1 to 3, components not included are left blank, and numerical values not satisfying the features of the present invention are underlined.

Regarding the fabricated brazing sheets, the post-brazing strength, erosion resistance, brazability and corrosion resistance on the sacrificial layer side were evaluated in the following ways.

<Post-Brazing Strength>

After applying a heat treatment to each sample in a drop tape fluidity test under conditions simulating the brazing (by heating at a temperature of 590° C. or higher (at a maximum of 600° C.) for three minutes under a nitrogen atmosphere with an oxygen concentration of 200 ppm or less at a dew point of −40° C.), the sample was processed into specimens of JIS No. 5 (specifically, three specimens were fabricated from each sample). These specimens were allowed to stand at room temperature (25° C.) for one week, and the tensile strength of each specimen was measured by a tensile test in conformity with JIS 22241 to determine the post-brazing strength. Samples having an average post-brazing strength of the three specimens of 210 MPa or more were rated as being excellent (A); samples having an average post-brazing strength of 190 MPa or more and less than 210 MPa were rated as being good (B); and samples having a strength of less than 190 MPa were rated as being unsatisfactory (C).

<Erosion Resistance>

Further, each sample was cold-rolled at a rolling rate of 10%, and then subjected to a heat treatment in the drop test system under conditions simulating the brazing (by heating at a temperature of 590° C. or higher (at a maximum of 600° C.) for three minutes under a nitrogen atmosphere with an oxygen concentration of 200 ppm or less at a dew point of −40° C.), to form specimens for evaluation. Each specimen obtained in this manner was cut into 2 cm square piece and embedded in resin. The cut surface of the specimen was polished, followed by etching with a Keller's reagent, and the polished surface was then observed with a microscope. Samples in which an area ratio of a part with no erosion in the core layer was 50% or more were rated as being good (B) in terms of erosion resistance; and samples having an area ratio of a part with no erosion in the core layer was less than 50% were rated as being unsatisfactory (C). Note that the evaluation of the erosion resistance was performed only on samples rated as being good or higher in terms of the post-brazing strength.

<Brazability>

Figure 1B:
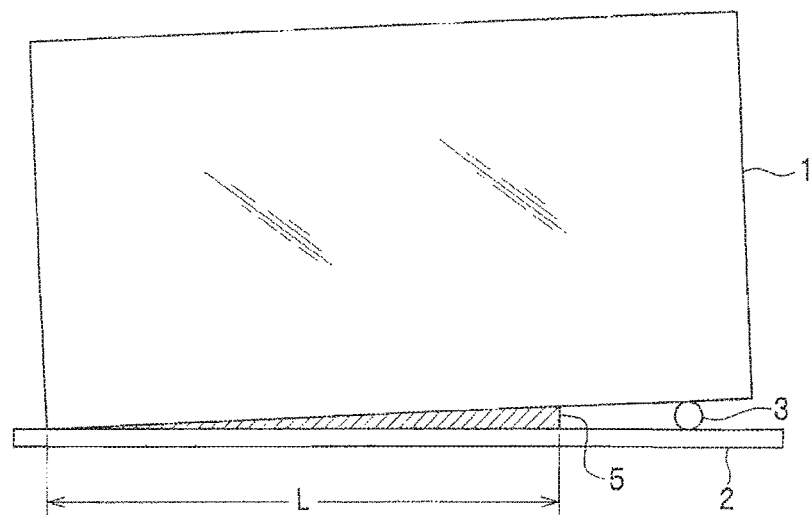

FIGS. 1A and 1B are schematic diagrams of a jig for evaluating the brazability of the brazing sheet formed of the aluminum alloy according to the present invention, in which FIG. 1A is a perspective view of the entire jig, and FIG. 1B is a front view of the jig. Note that FIG. 1B omits the illustration of the wire 4.

A specimen with a size of 25 mm width×60 mm length was cut out of each sample, and a non-corrosive flux FL-7 (manufactured by MORITA CHEMICAL INDUSTRIES Co., Ltd.) was applied on a brazing filler layer surface of the specimen at a density of 5 g/m$^2$, followed by drying. As shown in FIG. 1A, the specimen (lower sheet 2) was placed such that the brazing filler layer surface onto which the flux was applied was directed upward, and a 3003 alloy sheet (upper sheet 1) with 1 mm thickness and 25 mm width×55 mm length was placed on the specimen vertically relative to the specimen via a round bar as a spacer 3 made of stainless steel and having a diameter of 2 mm, and then they were fixed by wires 4. At this time, the position of the spacer 3 was set at a distance of 50 mm from one end (left end shown in FIG. 1B) of the specimen. Onto this specimen, a heat treatment simulating brazing was performed (by heating at 590° C. or higher (at a maximum of 600° C.) for three minutes under a nitrogen atmosphere having a dew point of −40° C. and an oxygen concentration of 200 ppm or less). As shown in FIG. 1B, a length L of a fillet 5 charged into a gap between the specimen (lower sheet 2) and the 3003 alloy sheet (upper sheet 1) was measured. Samples having the fillet length L of 25 mm or more were rated as being good (B) in terms of brazability; and samples having the fillet length L of less than 25 mm were rated as being unsatisfactory (C). Note that the evaluation of this brazability was performed only on samples rated as being good or higher in terms of the post-brazing strength and erosion resistance.

<Corrosion Resistance>

After applying a heat treatment to the sample in the drop test system under conditions simulating the brazing (by heating at a temperature of 590° C. or higher (at a maximum of 600° C.) for three minutes under a nitrogen atmosphere with an oxygen concentration of 200 ppm or less at a dew point of −40° C.), the sample was cut into pieces, each having the size of 50 mm width×60 mm length, which were used as specimens for evaluation. A masking seal having the size of 60 mm width and 70 mm length was placed to cover the entire surface of the brazing filler layer surface and further folded toward the sacrificial layer surface side, covering edge parts with a width of 5 mm from respective four sides of the sacrificial layer surface.

A corrosion test including 90 cycles was performed on the specimen. Each cycle involved immersing the specimen in a test solution that contained $Na^+$: 118 ppm, $Cl^-$: 58 ppm, $SO_4^{2-}$: 60 ppm, $Cu^{2+}$: 1 ppm, and $Fe^{3+}$: 30 ppm (at 88° C. for 8 hours), naturally cooling the specimen to the room temperature while immersing the specimen in the test solution, and then holding the specimen at the room temperature for 16 hours. A corrosion state of the sacrificial-layer surface of each specimen was observed with an optical microscope, whereby a depth of corrosion in the specimen was measured by a focal depth method. Samples of the specimens having the ratio of a maximum depth of corrosion relative to the sheet thickness of 50% or less were rated as being good (B); and samples of the specimens having the ratio exceeding 50% were rated as being unsatisfactory (C). Note that the evaluation of this corrosion resistance was performed only on samples rated as being good or higher in terms of the post-brazing strength, erosion resistance, and brazability.

The results of these tests are shown in Tables 4 and 5. Note that in Tables 4 to 5, items incapable of being evaluated or not evaluated are indicated by a mark "–", and factors not satisfying the features of the present invention are indicated by underlining numeral values.

TABLE 1

| Core layer No. | % by mass, The balance being Al and inevitable impurities | | | | | | Note |
|---|---|---|---|---|---|---|---|
| | Cu | Mn | Si | Mg | Cr | Zr | Ti | |
| S1 | 1.55 | 1.20 | | | | | | Inventive Example |
| S2 | 2.50 | 1.20 | | | | | | |
| S3 | 2.00 | 0.50 | | | | | | |
| S4 | 2.00 | 2.00 | | | | | | |
| S5 | 2.00 | 1.20 | 0.05 | | | | | |
| S6 | 2.00 | 1.20 | 0.50 | | | | | |
| S7 | 2.00 | 1.20 | | 0.05 | | | 0.05 | |
| S8 | 2.00 | 1.20 | | 0.50 | 0.05 | | | |
| S9 | 2.00 | 1.20 | | | 0.25 | 0.05 | | |
| S10 | 2.00 | 1.20 | | | | 0.25 | | |
| S11 | 2.00 | 1.20 | | | | | 0.30 | |
| S12 | 2.00 | 1.20 | 0.35 | 0.20 | | | 0.15 | |
| S13 | 2.00 | 1.20 | 0.20 | 0.35 | | 0.15 | 0.15 | |
| S14 | 2.00 | 1.20 | 0.25 | 0.25 | 0.15 | | 0.15 | |
| S15 | <u>1.50</u> | 1.20 | | | | | | Comparative Example |
| S16 | <u>2.55</u> | 1.20 | | | | | | |
| S17 | 2.00 | <u>0.45</u> | | | | | | |
| S18 | 2.00 | <u>2.05</u> | | | | | | |
| S19 | 2.00 | 1.20 | <u>0.55</u> | | | | | |
| S20 | 2.00 | 1.20 | | <u>0.55</u> | 0.05 | | | |
| S21 | 2.00 | 1.20 | | | <u>0.35</u> | 0.05 | | |
| S22 | 2.00 | 1.20 | | | | <u>0.35</u> | 0.05 | |
| S23 | 2.00 | 1.20 | | | | | <u>0.35</u> | |

TABLE 2

| Brazing filler layer No. | % by mass, The balance being Al and inevitable impurities Si | Note |
|---|---|---|
| R1 | 10.0 | Inventive Example |
| R2 | 5.0 | |
| R3 | 12.5 | |

TABLE 3

| Sacrificial layer No. | % by mass, The balance being Al and inevitable impurities | | | | | | | Note |
|---|---|---|---|---|---|---|---|---|
| | Zn | Mg | Si | Mn | Ti | Cr | Zr | |
| G1 | 2.00 | 1.50 | | | | | | Inventive Example |
| G2 | 7.00 | 1.50 | | | | | | |
| G3 | 3.50 | 0.35 | | | | | | |
| G4 | 3.50 | 3.00 | | | | | | |
| G5 | 3.50 | 1.50 | 0.05 | | | | | |
| G6 | 3.50 | 1.50 | 0.50 | | | | | |
| G7 | 3.50 | 1.50 | | 0.30 | | | | |
| G8 | 3.50 | 1.50 | | 2.00 | | | | |
| G9 | 3.50 | 1.50 | | | 0.30 | | | |
| G10 | 3.50 | 1.50 | | | | 0.30 | | |
| G11 | 3.50 | 1.50 | | | | | 0.30 | |
| G12 | <u>1.50</u> | 1.50 | | | | | | Comparative Example |
| G13 | <u>7.50</u> | 1.50 | | | | | | |
| G14 | 3.50 | <u>0.07</u> | | | | | | |
| G15 | 3.50 | <u>3.05</u> | | | | | | |
| G16 | 3.50 | 1.50 | <u>0.55</u> | | | | | |
| G17 | 3.50 | 1.50 | | <u>2.05</u> | | | | |
| G18 | 3.50 | 1.50 | | | <u>0.35</u> | | | |
| G19 | 3.50 | 1.50 | | | | <u>0.35</u> | | |
| G20 | 3.50 | 1.50 | | | | | <u>0.35</u> | |

TABLE 4

| Sample No. | Core layer No. | Brazing filler layer No. | Brazing filler layer Thickness (μm) | Sacrificial layer No. | Sacrificial layer Thickness (μm) | Sheet thickness (μm) | Total clad rate (%) | Post-brazing strength Evaluation | Strength (MPa) | Erosion resistance | Brazability | Corrosion resistance | Note |
|---|---|---|---|---|---|---|---|---|---|---|---|---|---|
| 1 | S1 | R1 | 30 | G1 | 30 | 170 | 35 | B | 199 | B | B | B | Example |
| 2 | S2 | R1 | 30 | G1 | 30 | 170 | 35 | B | 207 | B | B | B | |
| 3 | S3 | R1 | 30 | G1 | 30 | 170 | 35 | B | 203 | B | B | B | |
| 4 | S4 | R1 | 30 | G1 | 30 | 170 | 35 | B | 203 | B | B | B | |
| 5 | S5 | R1 | 30 | G1 | 30 | 170 | 35 | B | 205 | B | B | B | |
| 6 | S6 | R1 | 30 | G1 | 30 | 170 | 35 | A | 228 | B | B | B | |
| 7 | S7 | R1 | 30 | G1 | 30 | 170 | 35 | B | 206 | B | B | B | |
| 8 | S8 | R1 | 30 | G1 | 30 | 170 | 35 | A | 241 | B | B | B | |
| 9 | S9 | R1 | 30 | G1 | 30 | 170 | 35 | B | 203 | B | B | B | |
| 10 | S10 | R1 | 30 | G1 | 30 | 170 | 35 | B | 200 | B | B | B | |
| 11 | S11 | R1 | 30 | G1 | 30 | 170 | 35 | B | 205 | B | B | B | |
| 12 | S12 | R1 | 30 | G1 | 30 | 170 | 35 | A | 234 | B | B | B | |
| 13 | S13 | R1 | 30 | G1 | 30 | 170 | 35 | A | 230 | B | B | B | |
| 14 | S14 | R1 | 30 | G1 | 30 | 170 | 35 | A | 235 | B | B | B | |

TABLE 4-continued

| Sample No. | Core layer No. | Brazing filler layer No. | Thickness (μm) | Sacrificial layer No. | Thickness (μm) | Sheet thickness (μm) | Total clad rate (%) | Post-brazing strength Evaluation | Strength (MPa) | Erosion resistance | Brazability | Corrosion resistance | Note |
|---|---|---|---|---|---|---|---|---|---|---|---|---|---|
| 15 | S12 | R2 | 30 | G2 | 30 | 170 | 35 | A | 236 | B | B | B | |
| 16 | S12 | R3 | 30 | G3 | 30 | 170 | 35 | A | 215 | B | B | B | |
| 17 | S12 | R1 | 30 | G4 | 30 | 170 | 35 | A | 259 | B | B | B | |
| 18 | S12 | R1 | 30 | G2 | 30 | 170 | 35 | A | 236 | B | B | B | |
| 19 | S12 | R1 | 30 | G3 | 30 | 170 | 35 | A | 215 | B | B | B | |
| 20 | S12 | R1 | 30 | G4 | 30 | 170 | 35 | A | 259 | B | B | B | |
| 21 | S12 | R1 | 30 | G5 | 30 | 170 | 35 | A | 236 | B | B | B | |
| 22 | S12 | R1 | 30 | G6 | 30 | 170 | 35 | A | 236 | B | B | B | |
| 23 | S12 | R1 | 30 | G7 | 30 | 170 | 35 | A | 235 | B | B | B | |
| 24 | S12 | R1 | 30 | G8 | 30 | 170 | 35 | A | 230 | B | B | B | |
| 25 | S12 | R1 | 30 | G9 | 30 | 170 | 35 | A | 240 | B | B | B | |
| 26 | S12 | R1 | 30 | G10 | 30 | 170 | 35 | A | 233 | B | B | B | |
| 27 | S12 | R1 | 30 | G11 | 30 | 170 | 35 | A | 236 | B | B | B | |
| 28 | S12 | R1 | 30 | G1 | 30 | 195 | 31 | A | 245 | B | B | B | |
| 29 | S12 | R1 | 20 | G1 | 25 | 90 | 50 | B | 193 | B | B | B | |
| 30 | S12 | R1 | 15 | G1 | 30 | 170 | 26 | A | 242 | B | B | B | |
| 31 | S12 | R1 | 50 | G1 | 30 | 170 | 47 | A | 225 | B | B | B | |
| 32 | S12 | R1 | 30 | G1 | 15 | 170 | 26 | A | 268 | B | B | B | |
| 33 | S12 | R1 | 30 | G1 | 50 | 170 | 47 | B | 193 | B | B | B | |
| 34 | S12 | R1 | 23 | G1 | 20 | 170 | 25 | A | 259 | B | B | B | |
| 35 | S12 | R1 | 45 | G1 | 40 | 170 | 50 | B | 204 | B | B | B | |

TABLE 5

| Sample No. | Core layer No. | Brazing filler layer No. | Thickness (μm) | Sacrificial layer No. | Thickness (μm) | Sheet thickness (μm) | Total clad rate (%) | Post-brazing strength Evaluation | Strength (MPa) | Erosion resistance | Brazability | Corrosion resistance | Note |
|---|---|---|---|---|---|---|---|---|---|---|---|---|---|
| 36 | S15 | R1 | 30 | G1 | 30 | 170 | 35 | C | 188 | — | — | — | Comparative Example |
| 37 | S16 | R1 | 30 | G1 | 30 | 170 | 35 | — | — | — | — | — | |
| 38 | S17 | R1 | 30 | G1 | 30 | 170 | 35 | C | 187 | — | — | — | |
| 39 | S18 | R1 | 30 | G1 | 30 | 170 | 35 | — | — | — | — | — | |
| 40 | S19 | R1 | 30 | G1 | 30 | 170 | 35 | — | — | — | — | — | |
| 41 | S20 | R1 | 30 | G1 | 30 | 170 | 35 | A | 245 | B | C | — | |
| 42 | S21 | R1 | 30 | G1 | 30 | 170 | 35 | — | — | — | — | — | |
| 43 | S22 | R1 | 30 | G1 | 30 | 170 | 35 | — | — | — | — | — | |
| 44 | S23 | R1 | 30 | G1 | 30 | 170 | 35 | — | — | — | — | — | |
| 45 | S12 | R1 | 14 | G1 | 30 | 170 | 26 | A | 242 | B | C | — | |
| 46 | S12 | R1 | 52 | G1 | 30 | 170 | 48 | A | 224 | C | — | — | |
| 47 | S12 | R1 | 30 | G12 | 30 | 170 | 35 | A | 236 | B | B | C | |
| 48 | S12 | R1 | 30 | G13 | 30 | 170 | 35 | — | — | — | — | — | |
| 49 | S12 | R1 | 30 | G14 | 30 | 170 | 35 | C | 189 | — | — | — | |
| 50 | S12 | R1 | 30 | G15 | 30 | 170 | 35 | — | — | — | — | — | |
| 51 | S12 | R1 | 30 | G16 | 30 | 170 | 35 | — | — | — | — | — | |
| 52 | S12 | R1 | 30 | G17 | 30 | 170 | 35 | — | — | — | — | — | |
| 53 | S12 | R1 | 30 | G18 | 30 | 170 | 35 | — | — | — | — | — | |
| 54 | S12 | R1 | 30 | G19 | 30 | 170 | 35 | — | — | — | — | — | |
| 55 | S12 | R1 | 30 | G20 | 30 | 170 | 35 | — | — | — | — | — | |
| 56 | S12 | R1 | 30 | G1 | 30 | 13 | 160 | 27 | A | 270 | B | B | C | |
| 57 | S12 | R1 | 30 | G1 | 55 | 170 | 50 | — | — | — | — | — | |
| 58 | S12 | R1 | 30 | G1 | 20 | 90 | 56 | B | 191 | B | C | — | |

As shown in Tables 1 and 2, brazing sheets (samples No. 1 to 35) were manufactured using the core layers (core layers No. S1 to S14), the brazing filler layers (brazing filler layers No. R1 to R3), and the sacrificial layers (sacrificial layers No. G1 to G11) that were made of the aluminum alloys satisfying the arrangement of the present invention. In these brazing sheets, the thickness of each of the brazing filler layer and the sacrificial layer was in a range of 15 to 50 μm, the thickness of the brazing sheet was less than 200 μm, and the total clad rate was 50% or less. Such brazing sheets had excellent post-brazing strength (test materials Nos. 1 to 35), erosion resistance, brazability and corrosion resistance.

In contrast, samples No, 36 to 58 did not satisfy the structure of the present invention and thus had the following results.

In sample No. 36, the Cu content of the core layer was small, and in sample No. 38, the Mn content of the core layer was small. Both samples No. 36 and No. 38 had unsatisfactory results of the evaluation in terms of the post-brazing strength. In sample No. 37, the Cu content of the core layer was large, and in sample No. 40, the Si content of the core layer was large. The core layers of both samples No. 37 and 40 melted during brazing. In sample No. 39, the Mn content of the core layer was large, in sample No. 42, the Cr content of the core layer was large, in sample No. 43, the Zr content of the core layer was large, and in sample No. 44, the Ti content of the core layer was large. In these samples No. 39, 42, 43 and 44, cracking occurred during rolling, failing to fabricate a specimen. In sample No. 41, the Mg content of the core layer was large, resulting in insufficient brazability.

In sample No. 47, the Zn content of the sacrificial layer was small, and had unsatisfactory result of the evaluation in terms of corrosion resistance. In sample No. 49, the Mg content of the sacrificial layer was small, and had unsatisfactory result of the evaluation in terms of post-brazing strength. In sample No. 48, the Zn content of the sacrificial layer was large, and in sample No. 51, the Si content of the sacrificial layer was large. In both samples No. 48 and 51, the sacrificial layers were melted during brazing. In sample No. 50, the Mg content of the sacrificial layer was large, reducing the pressure-bondability, failing to fabricate a specimen. In sample No. 52, the Mn content of the sacrificial layer was large; in sample No. 53, the Ti content of the sacrificial layer was large; in sample No. 54, the Cr content of the sacrificial layer was large; and in sample No. 55, the Zr content of the sacrificial layer was large. In each of samples No. 52, 53, 54 and 55, cracking was caused during rolling, failing to fabricate a specimen.

In sample No. 45, the brazing filler layer was thin, resulting in unsatisfactory brazability. In sample No. 46, the brazing filler layer was thick, degrading the erosion resistance. In sample No. 56, the sacrificial layer was thin, resulting in unsatisfactory corrosion resistance. In sample No. 57, the sacrificial layer was thick, degrading the pressure-bondability, failing to fabricate a specimen.

In sample No. 58, the thicknesses of the brazing filler layer and the sacrificial layer satisfied the requirement of the present invention, but the total clad rate exceeded its upper limit, resulting in unsatisfactory brazability.

This application claims priority based on Japanese Patent Application 2014-070430 filed on Mar. 28, 2014, the disclosure of which is incorporated by reference herein.

DESCRIPTION OF REFERENCE NUMERALS

1 Upper sheet
2 Lower sheet
3 Spacer
4 Wire
5 Fillet
L Fillet length

The invention claimed is:
1. A brazing sheet formed of an aluminum alloy, the brazing sheet comprising
a core layer,
a brazing filler layer provided on one side of the core layer and formed of an Al—Si based alloy, and
a sacrificial layer provided on the other side of the core layer,
wherein
the brazing sheet has a thickness of equal to or less than 195 μm,
the core layer comprises Cu in an amount of more than 1.5% by mass and 2.5% or less by mass, Mn in an amount of 0.5 to 2.0% by mass, Si in an amount of 0.10% or less by mass, and Al,
the sacrificial layer comprises Zn in an amount of 2.0 to 7.0% by mass, Mg in an amount of more than 0.10% by mass and 3.0% or less by mass, and Al,
each of the brazing filler layer and the sacrificial layer has a thickness of 15 to 50 μm, and a total of clad rates of the brazing filler layer and the sacrificial layer is equal to or less than 50%.
2. The brazing sheet according to claim 1, wherein the core layer comprises Si in an amount of 0.05% or more by mass.
3. The brazing sheet according to claim 2, wherein the core layer further comprises Mg in an amount of 0.05 to 0.5% by mass.
4. The brazing sheet according to claim 3, wherein the core layer further comprises at least one selected from the group consisting of Cr in an amount of 0.01 to 0.30% by mass, Zr in an amount of 0.01 to 0.30% by mass and Ti in an amount of 0.05 to 0.30% by mass.
5. The brazing sheet according to claim 4, wherein the sacrificial layer further comprises Si in an amount of 0.05 to 0.5% by mass.
6. The brazing sheet according to claim 5, wherein the sacrificial layer further comprises Mn in an amount of 0.1 to 2.0% by mass.
7. The brazing sheet according to claim 6, wherein the sacrificial layer further comprises Ti in an amount of 0.01 to 0.30% by mass.
8. The brazing sheet according to claim 7, wherein the sacrificial layer further comprises at least one selected from the group consisting of Cr in an amount of 0.01 to 0.30% by mass and Zr in an amount of 0.01 to 0.30% by mass.
9. The brazing sheet according to claim 3, wherein the sacrificial layer further comprises Si in an amount of 0.05 to 0.5% by mass.
10. The brazing sheet according to claim 2, wherein the core layer further comprises at least one selected from the group consisting of Cr in an amount of 0.01 to 0.30% by mass, Zr in an amount of 0.01 to 0.30% by mass and Ti in an amount of 0.05 to 0.30% by mass.
11. The brazing sheet according to claim 10, wherein the sacrificial layer further comprises Si in an amount of 0.05 to 0.5% by mass.
12. The brazing sheet according to claim 2, wherein the sacrificial layer further comprises Si in an amount of 0.05 to 0.5% by mass.
13. The brazing sheet according to claim 1, wherein the core layer further comprises Mg in an amount of 0.05 to 0.5% by mass.
14. The brazing sheet according to claim 13, wherein the core layer further comprises at least one selected from the group consisting of Cr in an amount of 0.01 to 0.30% by mass, Zr in an amount of 0.01 to 0.30% by mass and Ti in an amount of 0.05 to 0.30% by mass.
15. The brazing sheet according to claim 14, wherein the sacrificial layer further comprises Si in an amount of 0.05 to 0.5% by mass.
16. The brazing sheet according to claim 13, wherein the sacrificial layer further comprises Si in an amount of 0.05 to 0.5% by mass.
17. The brazing sheet according to claim 1, wherein the sacrificial layer further comprises Si in an amount of 0.05 to 0.5% by mass.
18. The brazing sheet according to claim 1, wherein the brazing sheet has a thickness of 80 μm to 180 μm.
19. The brazing sheet according to claim 1, wherein the sacrificial layer further comprises Ti in an amount of more than 0.05% by mass and 0.30% or less by mass.
20. The brazing sheet according to claim 1, wherein the sacrificial layer further comprises at least one selected from the group consisting of Cr in an amount of more than 0.05% by mass and 0.30% or less by mass and Zr in an amount of more than 0.05% by mass and 0.30% or less by mass.

\* \* \* \* \*